C. D. BROWN.
Hedge Bender.
No. 66,210.
Patented July 2, 1867.
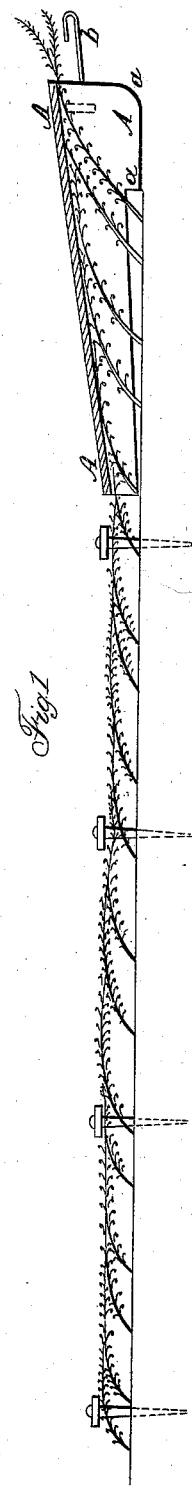
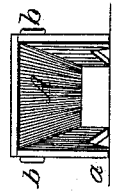
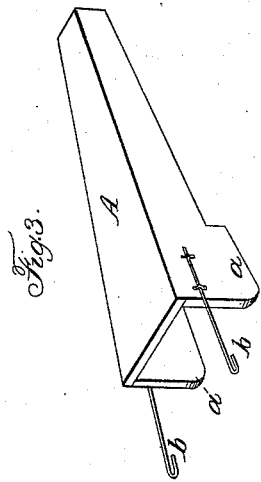

United States Patent Office.

C. D. BROWN, OF TAMPICO, ILLINOIS.

Letters Patent No. 66,210, dated July 2, 1867.

---

IMPROVEMENT IN DEVICE FOR BENDING DOWN PLANTS TO FORM HEDGES.

---

The Schedule referred to in these Letters Patent and making part of the same.

---

TO ALL WHOM IT MAY CONCERN:

Be it known that I, C. D. BROWN, of Tampico, in the county of Whiteside, and State of Illinois, have invented a new and improved Hedge-Bender; and I do hereby declare that the following is a full, clear, and exact description thereof, reference being had to the accompanying drawings, making a part of this specification, in which—

Figure 1 is a vertical sectional view, showing the manner of using the bender.
Figure 2 is a view of the rear end of the bender.
Figure 3 is a perspective view of the bender.
Similar letters of reference indicate corresponding parts in the three figures.

The object of this invention is to bend down rows of young plants of the Osage orange preparatory to fastening down with my hedge-fastener, an instrument which I shall describe in a subsequent application for a patent, the object of which is to form a thickly set foundation for an early, mature, and perfect fence.

To enable others skilled in the art to understand my invention, I will describe its construction and operation.

The bender consists of a tapering trough or box, the top and sides of which are closed, while the bottom and the ends are left open. This trough or bender A is supported at its largest end upon shoes or runners $a\ a$, and provided at such end with hitching-hooks $b\ b$, or other equivalent means, to which horses are attached for drawing the trough along over the plants. This bender may be made of any suitable length, say, about sixteen feet long; and it tapers from its front end backward, so as to gather in and bend down the plants evenly and in one direction, leaving the row straight and regular, so that the plants can be fastened down as above referred to.

I do not desire to confine my invention to the precise construction of the bending device herein described, as the construction may be modified and varied as circumstances require without changing the principle of my invention.

Having thus described my invention, what I claim as new, and desire to secure by Letters Patent, is—

The use of a tapering trough, constructed substantially as described, for the purpose of bending down hedges.

C. D. BROWN.

Witnesses:
R. S. MANGAN,
GEORGE W. SMITH.